United States Patent
Wang et al.

(10) Patent No.: US 12,043,406 B2
(45) Date of Patent: Jul. 23, 2024

(54) METHOD OF OPERATING A FUEL CELL ASSEMBLY FOR AN AIRCRAFT

(71) Applicant: General Electric Company, Schenectady, NY (US)

(72) Inventors: Honggang Wang, Clifton Park, NY (US); Sumit Bose, Niskayuna, NY (US)

(73) Assignee: General Electric Company, Cincinnati, OH (US)

(*) Notice: Subject to any disclaimer, the term of this patent is extended or adjusted under 35 U.S.C. 154(b) by 133 days.

(21) Appl. No.: 17/827,085

(22) Filed: May 27, 2022

(65) Prior Publication Data

US 2023/0382552 A1 Nov. 30, 2023

(51) Int. Cl.
| | | |
|---|---|---|
| B64D 41/00 | (2006.01) | |
| H01M 8/04298 | (2016.01) | |
| H01M 8/2465 | (2016.01) | |

(52) U.S. Cl.
CPC ........ B64D 41/00 (2013.01); H01M 8/04298 (2013.01); H01M 8/2465 (2013.01); *B64D 2041/005* (2013.01); *H01M 2250/20* (2013.01)

(58) Field of Classification Search
CPC ............. B64D 41/00; B64D 2041/005; H01M 8/04298; H01M 8/2465; H01M 2250/20; B64G 1/423; B64U 50/32
See application file for complete search history.

(56) References Cited

U.S. PATENT DOCUMENTS

| | | | |
|---|---|---|---|
| 3,658,279 A | 4/1972 | Robertson | |
| 3,805,517 A | 4/1974 | Sewell et al. | |
| 4,684,081 A | 8/1987 | Cronin | |
| 5,227,256 A | 7/1993 | Marianowski et al. | |
| 5,581,995 A | 12/1996 | Lucenko et al. | |
| 5,858,314 A | 1/1999 | Hsu et al. | |
| 5,968,680 A | 10/1999 | Wolfe et al. | |
| 6,183,703 B1 | 2/2001 | Hsu et al. | |
| 6,296,957 B1 | 10/2001 | Graage | |
| 6,348,278 B1 | 2/2002 | LaPierre et al. | |

(Continued)

FOREIGN PATENT DOCUMENTS

| | | |
|---|---|---|
| CA | 2446360 A1 | 4/2004 |
| CN | 100367556 C | 2/2008 |

(Continued)

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

(Continued)

*Primary Examiner* — Rodney A Bonnette
(74) *Attorney, Agent, or Firm* — Dority & Manning, P.A.

(57) ABSTRACT

A method of operating a fuel cell assembly for an aircraft is provided. The method includes: receiving flight load predictor data for a scheduled flight of the aircraft prior to initiation of the scheduled flight of the aircraft; and reconfiguring the fuel cell assembly in response to the received flight load predictor data prior to the initiation of the scheduled flight of the aircraft, wherein reconfiguring the fuel cell assembly comprises adding or removing a fuel cell module to or from the fuel cell assembly to increase or decrease a power capacity of the fuel cell assembly.

20 Claims, 6 Drawing Sheets

(56) References Cited

U.S. PATENT DOCUMENTS

| | | |
|---|---|---|
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,239,035 B2 | 7/2007 | Garces et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,137,854 B2 | 3/2012 | Gans |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 * | 9/2016 | Kim .................. H01M 8/0618 |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 * | 3/2019 | Lents .................. B64D 15/04 |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 * | 9/2020 | Sennoun .............. H01M 8/0618 |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,015,480 B2 | 5/2021 | Waun |
| 11,114,855 B2 | 9/2021 | Handelsman et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2009/0223726 A1 * | 9/2009 | Jeon .................. B60L 3/0053 |
| | | 180/65.285 |
| 2010/0133475 A1 | 6/2010 | Kobayashi et al. |
| 2010/0138070 A1 | 6/2010 | Beaudoin |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0063599 A1 | 2/2020 | Waun |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2021/0376307 A1 * | 12/2021 | Harada .............. H01M 50/249 |
| 2022/0009648 A1 * | 1/2022 | Clarke .................. F17C 1/00 |
| 2023/0228221 A1 * | 7/2023 | Wang .................. F02C 3/20 |
| | | 60/39.12 |
| 2023/0365263 A1 * | 11/2023 | Wang .................. H01M 8/10 |
| 2023/0369617 A1 * | 11/2023 | Wang .............. H01M 8/04992 |

FOREIGN PATENT DOCUMENTS

| | | |
|---|---|---|
| CN | 106976405 A | 7/2017 |
| DE | 102005012230 A1 | 10/2005 |
| DE | 10200950812 B4 | 4/2017 |
| EP | 2800186 B1 | 2/2018 |
| EP | 3336948 B1 | 9/2019 |
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO9965097 A1 | 12/1999 |
| WO | WO2018108962 A1 | 6/2018 |
| WO | WO2019160036 A1 | 8/2019 |
| WO | WO2020/011380 A1 | 1/2020 |

OTHER PUBLICATIONS

Feiner, Power-by-Wire Aircraft Secondary Power Systems, AIAA/IEEE Digital Avionics Systems Conference, 1993, pp. 439-444. (Abstract Only).

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

(56) References Cited

OTHER PUBLICATIONS

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

* cited by examiner

METHOD OF OPERATING A FUEL CELL ASSEMBLY FOR AN AIRCRAFT

FIELD

The present disclosure relates to a fuel cell assembly for an aircraft.

BACKGROUND

Aircraft may use a variety of power sources, including gas turbine engines, electric generators, energy storage systems, etc. At least certain aircraft may incorporate a fuel cell assembly in addition to, or in the alternative to, one or more of these power sources. The inventors of the present disclosure have found that improvements to fuel cell assemblies for incorporation into an aircraft would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGURES, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "first", "second", and "third" may be used interchangeably to distinguish one component from another and are not intended to signify location or importance of the individual components.

The present disclosure is generally related to a method of operating a fuel cell assembly for an aircraft. The method includes receiving flight load predictor data for a scheduled flight of the aircraft prior to initiation of the scheduled flight of the aircraft; and reconfiguring the fuel cell assembly in response to the received flight load predictor data prior to the initiation of the scheduled flight of the aircraft. In at least certain exemplary aspects, reconfiguring the fuel cell assembly includes adding or removing a fuel cell module to or from the fuel cell assembly to increase or decrease a power capacity of the fuel cell assembly.

For example, in response to receiving flight load predictor data indicating that an anticipated electrical load required by the fuel cell assembly for the scheduled flight is higher than an electrical load capacity of the fuel cell assembly in the present configuration, the method may add the fuel cell module to the fuel cell assembly to increase the power capacity of the fuel cell assembly. By contrast, in response to receiving flight load predictor data indicating that an anticipated electrical load required by the fuel cell assembly for the scheduled flight is lower than an electrical load capacity of the fuel cell assembly in the present configuration, the method may remove the fuel cell module from the fuel cell assembly to decrease the power capacity of the fuel cell assembly (and further to decrease a weight of the fuel cell assembly).

In such a manner, the fuel cell assembly may be reconfigured to provide a sufficient power capacity for a scheduled flight, while still minimizing a weight of the fuel cell assembly for flights requiring a lesser power capacity.

Figure 1:
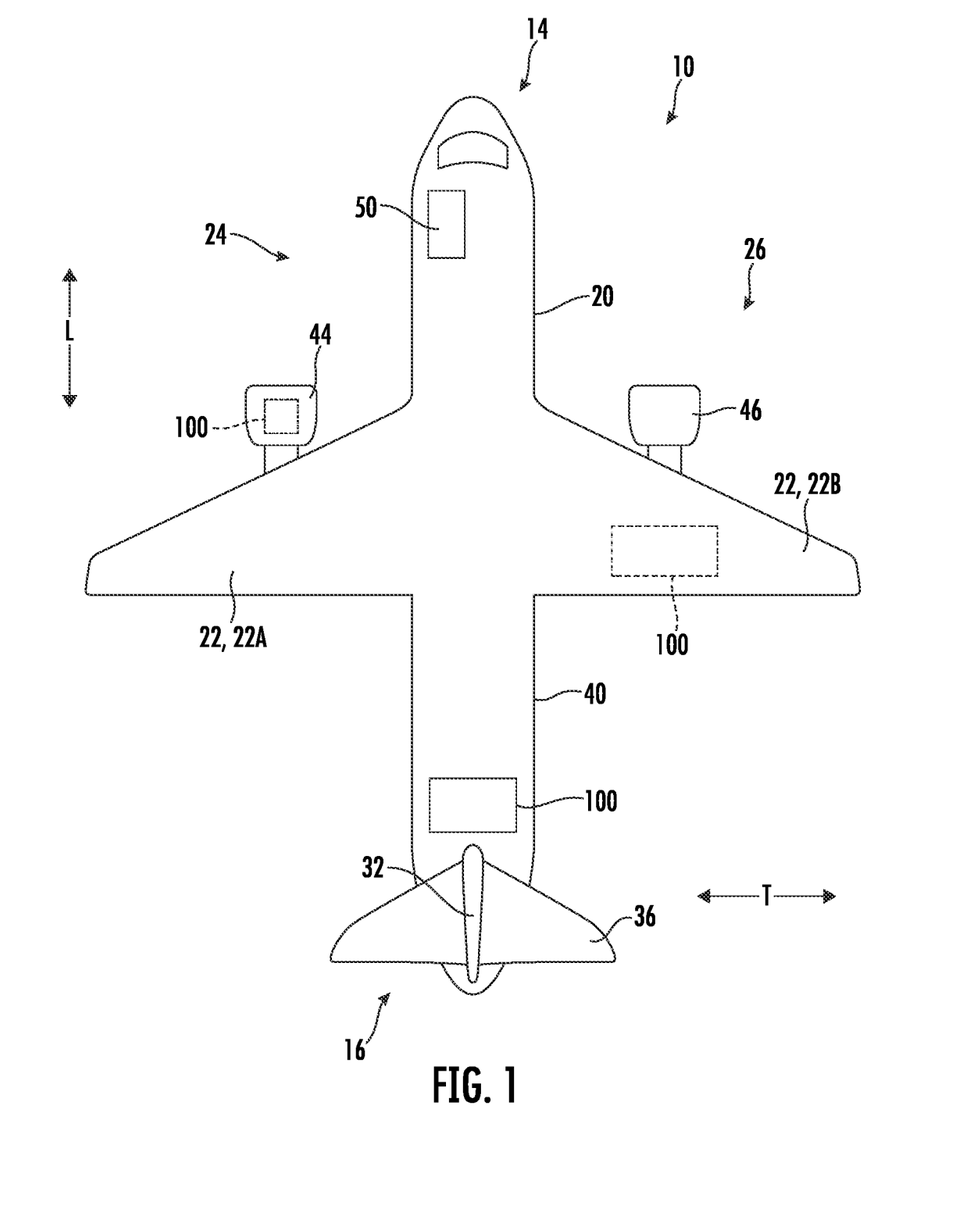
FIG. 1 is a schematic cross-sectional view of a gas turbine engine in accordance with an exemplary aspect of the present disclosure.

Referring now to the drawings, wherein identical numerals indicate the same elements throughout the FIGURES, FIG. 1 provides a top view of an exemplary aircraft 10 as may incorporate various embodiments of the present disclosure. As shown in FIG. 1, the aircraft 10 defines a longitudinal direction L that extends therethrough, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from a port side 24 of the fuselage 20. Further, the second wing 22B similarly extends outwardly from the fuselage 20, generally along the transverse direction T with respect to the longitudinal direction L, from a starboard side 26 of the fuselage 20. In addition, the aircraft 10 further includes a vertical stabilizer 32 and a pair of horizontal stabilizers 36. The fuselage 20 additionally includes an outer surface 40. The fuselage 20, wings 22, and stabilizers 32, 36 may together be referred to as a body of the aircraft 10.

However, it should be appreciated that in other exemplary embodiments of the present disclosure, the aircraft 10 may additionally or alternatively include any other suitable configuration of, e.g., stabilizers that may or may not extend directly along a vertical direction or horizontal/transverse direction T, wings 22, etc.

The exemplary aircraft 10 of FIG. 1 also includes a propulsion system. The exemplary propulsion system depicted includes a plurality of aircraft engines, at least one of which is mounted to each of the pair of wings 22A, 22B. Specifically, the plurality of aircraft engines includes a first aircraft engine 44 mounted to the first wing 22A and a second aircraft engine 46 mounted to the second wing 22B. In at least certain exemplary embodiments, the aircraft engines 44, 46 may be configured as turbofan jet engines suspended beneath the wings 22A, 22B in an under-wing configuration.

Alternatively, however, in other exemplary embodiments any other suitable aircraft engine may be provided. For example, in other exemplary embodiments the first and/or second aircraft engines 44, 46 may alternatively be configured as turbojet engines, turboshaft engines, turboprop engines, etc. Further, in still other exemplary embodiments, the propulsion system may additionally or alternatively include one or more electric, or hybrid-electric, aircraft engines (e.g., electric fans).

The aircraft 10 further includes a power system having a fuel cell assembly 100. The fuel cell assembly 100 is positioned within the fuselage 20 of the aircraft 10, within the wings 22 of the aircraft 10, within a propulsor (e.g., first or second aircraft 10 engines 44, 46) of the aircraft 10, or a combination thereof. In particular, for the embodiment depicted, the fuel cell assembly 100 is positioned within the fuselage 20 of the aircraft 10, and more specifically, within the fuselage 20 of the aircraft 10 proximate the aft end 16 of the aircraft 10.

However, as will be appreciated, and as is depicted in phantom, in other exemplary aspects, the fuel cell assembly 100 may additionally or alternatively be positioned in one or both wings 22 of the aircraft 10, within the propulsor (e.g., first or second aircraft 10 engines 44, 46) of the aircraft 10, or both.

Briefly, it will further be appreciated that the aircraft 10 includes an aircraft controller 50. The aircraft controller 50 may be operably coupled to one or more outside data sources for receiving data from such outside data sources relating to, e.g., a passenger number (or passenger count) for a particular flight operation, weather data for the flight operation, flight data, etc. The aircraft controller 50 may include a similar structure as the controller 124 of the fuel cell assembly 100 described below with reference to FIG. 5.

Figure 2:
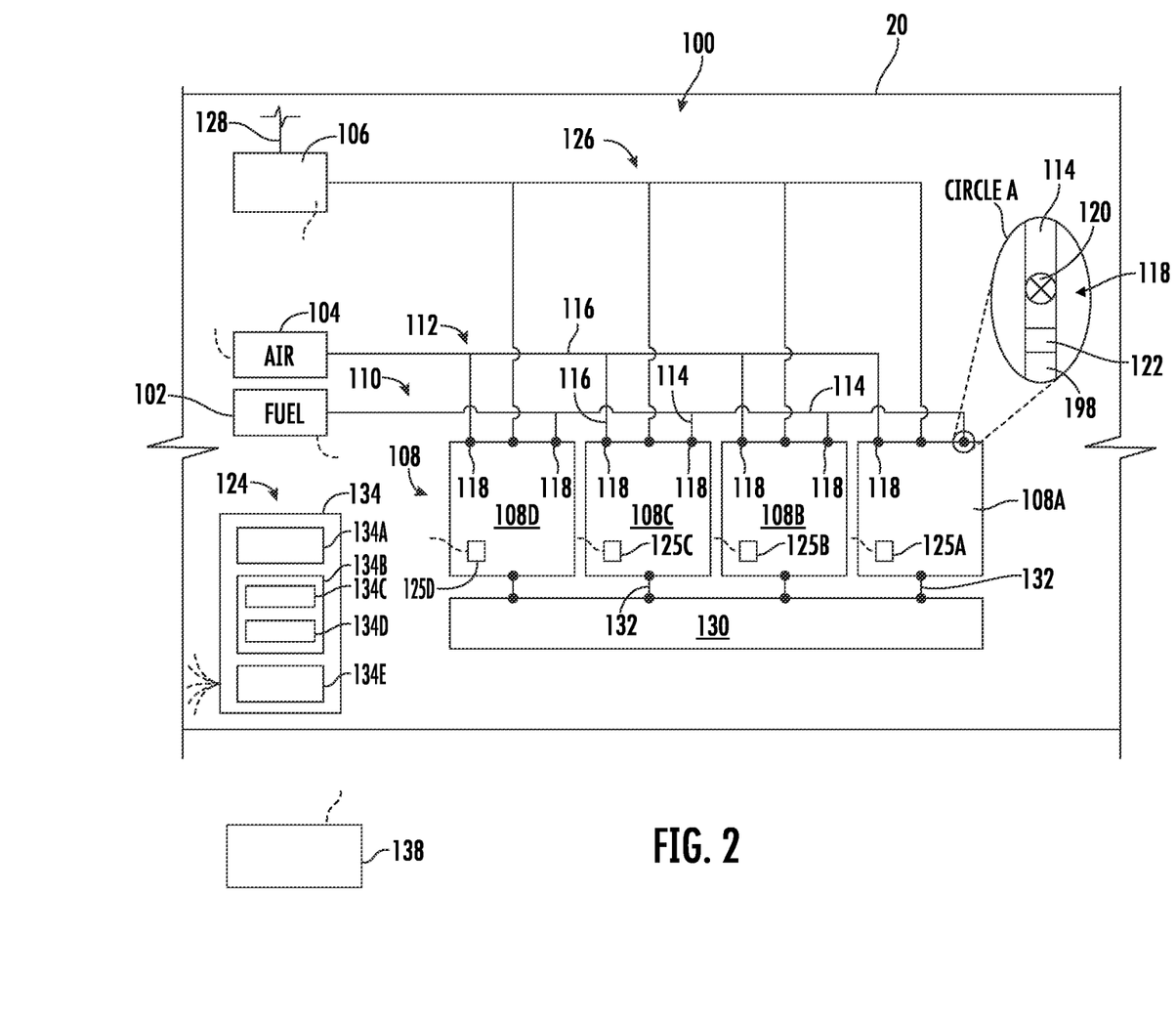
FIG. 2 is a schematic view of a fuel cell assembly of the present disclosure in a first configuration.

Referring now to FIG. 2, a schematic diagram is provided of the exemplary fuel cell assembly 100 introduced above with reference to FIG. 1. As will be appreciated, the exemplary fuel cell assembly 100 depicted is positioned within the fuselage 20 of the aircraft 10.

The fuel cell assembly 100 generally includes a fuel source 102, an air source 104, a power electronics device 106, and a plurality of fuel cell modules 108.

The fuel source 102 may be any suitable fuel source 102. For example, the fuel source 102 may be a fuel source of the aircraft 10, such as a fuel tank containing, e.g., a hydrocarbon-based fuel, such as Jet A aircraft fuel or the like. With such a configuration, the fuel source 102 may include a fuel processing unit (not depicted) configured to generate a flow of hydrogen fuel from the hydrocarbon based fuel. The fuel processing unit may be any suitable structure for generating a hydrogen rich fuel stream. For example, the fuel processing unit may include a fuel reformer or a catalytic partial oxidation convertor (CPOx) for developing the hydrogen rich fuel stream. If included, the fuel processing unit may be in series fluid communication between the fuel source 102 and the plurality of fuel cell modules 108.

Additionally or alternatively, the fuel source 102 may be a hydrogen fuel source (such as hydrogen fuel store in a gaseous or liquid state). Additionally or alternatively, still, the fuel cell assembly 100 may be configured to process fuel directly within the plurality of fuel cell modules 108.

The air source 104 may be any suitable source of air for the fuel cell modules 108. For example, in certain exemplary aspects, the air source 104 may be an ambient air source (e.g., from a ram air inlet), may be a high temperature air source from, e.g., one or more engines of the aircraft 10 (e.g., aircraft engines 44, 46), may be an internal aircraft air source 104 from, e.g., a cabin of the aircraft 10, etc. Selection of the air source 104 may be based at least in part on a chemistry of the plurality of fuel cell modules 108, as will be discussed in more detail below.

Each fuel cell module 108 of the plurality of fuel cell modules 108 is configured as a fuel cell stack. For example, the plurality of fuel cell modules 108 includes a first fuel cell module 108A configured as a first fuel cell stack 156 (see FIG. 3). Notably, in the embodiment depicted, the plurality of fuel cell modules 108 further includes a second fuel cell module 108B, a third fuel cell module 108C, and a fourth fuel cell module 108D, each configured as a fuel cell stack.

Figure 3:
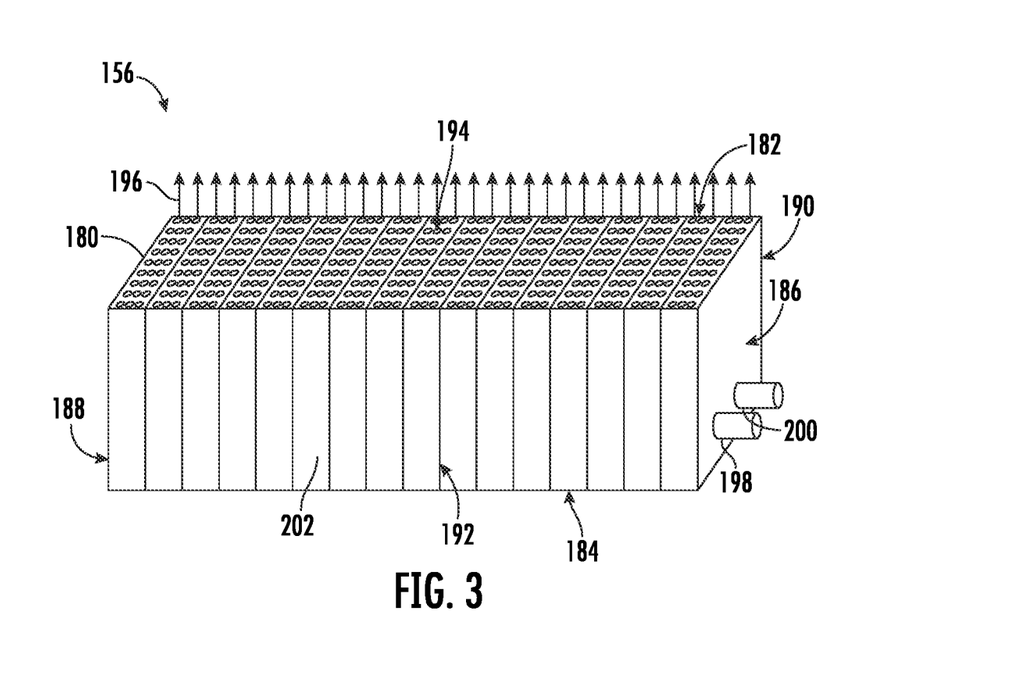
FIG. 3 is a schematic view of a first fuel cell stack of a first fuel cell module of the exemplary fuel cell assembly of FIG. 2.

Moreover, referring now to FIG. 3, a schematic illustration is provided as a perspective view of the first fuel cell stack 156 of the first fuel cell module 108A of the fuel cell assembly 100 of FIG. 2.

The first fuel cell stack 156 depicted includes a housing 180 having an outlet side 182 and a side 184 that is opposite to the outlet side 182, a fuel and air inlet side 186 and a side 188 that is opposite to the fuel and air inlet side 186, and sides 190, 192. The side 190, the side 188, and the side 184 are not visible in the perspective view of FIG. 3.

As will be appreciated, the first fuel cell stack 156 may include a plurality of fuel cells 202 that are "stacked," e.g., side-by-side from one end of the first fuel cell stack 156 (e.g., fuel and air inlet side 186) to another end of the first fuel cell stack 156 (e.g., side 188). As such, it will further be appreciated that the outlet side 182 includes a plurality of outlets 194, each from a respective fuel cell 202 of the first fuel cell stack 156. During operation, output products 196 are directed from the outlets 194 out of the housing 180. As will be appreciated from the description of FIG. 4, below, the outlets 194 include separate fuel outlets and air outlets.

The fuel and air inlet side 186 includes one or more fuel inlets 198 and one or more air inlets 200. Optionally, one or more of the inlets 198, 200 can be on another side of the housing 180.

Figure 4:
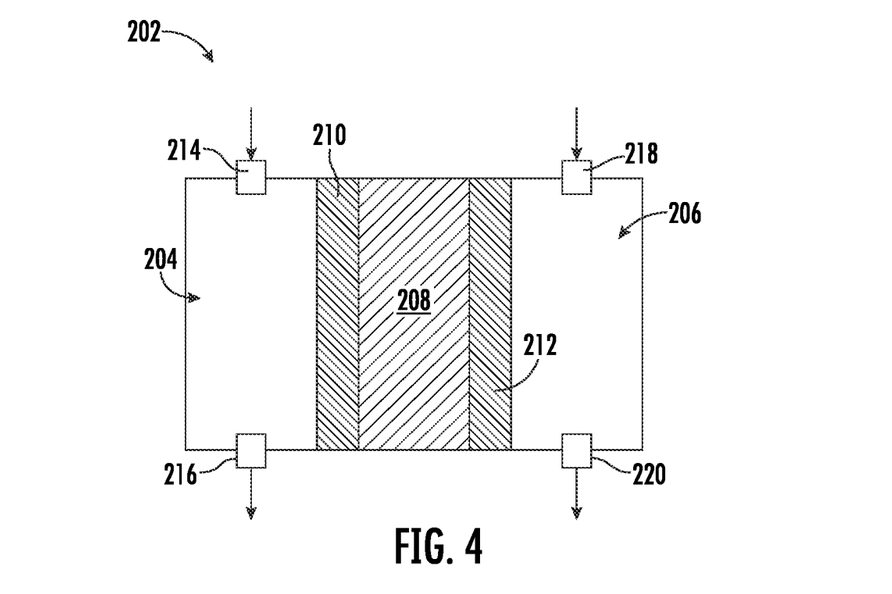
FIG. 4 is a schematic view of a fuel cell of the first fuel cell stack of FIG. 3.

Referring now to FIG. 4, a close-up, schematic view is provided of a fuel cell 202 of the first fuel cell stack 156 of FIG. 3. As will be appreciated, fuel cells are electrochemical devices which may convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. As a single fuel cell, such as the fuel cell 202 depicted in FIG. 4, may only be capable of generating on the order of one (1) volt of power, a plurality of fuel cells may be stacked together to form a fuel cell stack, such as the first fuel cell stack 156 of FIG. 3, to generate a desired voltage for the first fuel cell stack 156.

The exemplary fuel cell 202 depicted in FIG. 4, and each of the fuel cells 202 of the first fuel cell stack 156 of FIG. 3, may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes.

More specifically as is depicted schematically in FIG. 4, the fuel cell 202 generally includes a cathode side 204, an anode side 206, and an electrolyte layer 208 positioned between the cathode side 204 and the anode side 206. The cathode side 204 may generally include a cathode 210 and the anode side 206 and generally include an anode 212.

The cathode side 204 includes a cathode inlet 214 and a cathode outlet 216 and the anode side 206 includes an anode inlet 218 and an anode outlet 220. The cathode side 204 of the fuel cell 202, and more specifically, the cathode inlet 214 of the cathode side 204 of the fuel cell 202, is in fluid communication with the air source 104 of the fuel cell assembly 100 (FIG. 2). By contrast, the anode side 206 of the fuel cell 202, and more specifically, the anode inlet 218 of the anode side 206 of the fuel cell 202, is in fluid communication with the fuel source 102 of the fuel cell assembly 100 (FIG. 2).

Referring now back to FIG. 2, it will be appreciated that the fuel cell assembly 100 further includes a fuel delivery circuit 110 and an air delivery circuit 112.

The fuel delivery circuit 110 includes a fuel line 114, or rather a plurality of fuel lines 114, extending from the fuel source 102 to each of the plurality of fuel cell modules 108, and more specifically, to the fuel inlet 198 of each of the plurality of fuel cell modules 108. The air delivery circuit 112 similarly includes an air line 116, or rather a plurality of air lines 116, extending from the air source 104 to each of the plurality of fuel cell modules 108, and more specifically, to the air inlet 200 (see FIG. 3) of each of the plurality of fuel cell modules 108.

Further, for the exemplary aspect depicted, as is shown in the callout circle A in FIG. 2, the first fuel cell module 108A is coupled to the fuel line 114 of the fuel delivery circuit 110 using a connection assembly 118 formed by the fuel line 114 and the fuel inlet 198 of the first fuel cell module 108A. More specifically, the connection assembly 118 includes a shut-off valve 120 in fluid communication with the fuel line 114 of the fuel delivery circuit 110 and a fluid connection 122 formed by the fuel lines 114 of the fuel delivery circuit 110 and the fuel inlet 198 of the first fuel cell module 108A. The shut-off valve 120 may be, e.g., a ball valve, a gate valve, or any other suitable valve. The shut-off valve 120 may be manually-actuated, may be electrically actuated (and, e.g., in operable communication with a controller 124 of the fuel cell assembly 100, discussed below), or both. Further, the fluid connection 122 may be, e.g., a threaded fluid connection, a flange bolt connection, etc.

Additionally, or alternatively, the fluid connection 122 may be a quick release fluid connection. Such may facilitate a relatively quick disconnection and connection of the first fuel cell module 108A.

The connection assembly 118 is positioned proximate the first fuel cell module 108A and in series with the first fuel cell module 108A, with the first fuel cell module 108A being the only fuel cell module 108 of the plurality of fuel cell modules 108 located downstream of the connection assembly 118.

Notably, as briefly mentioned above, the plurality of fuel cell modules 108 further includes the second fuel cell module 108B, the third fuel cell module 108C, and the fourth fuel cell module 108D. Each of these fuel cell modules 108 includes a fuel inlet 198 and an air inlet 200, similar to the first fuel cell module 108A (see also FIG. 3).

It will be appreciated that for the embodiment shown, each of the plurality of fuel lines 114 connecting to a respective fuel cell module 108 of the plurality fuel cell modules 108 includes a connection assembly 118 formed with a respective fuel inlet 198 of the respective fuel cell module 108, the connection assembly 118 configured in a similar manner as the connection assembly 118 formed with the fuel inlet 198 of the first fuel cell module 108A. In such a manner, it will be appreciated that the fuel delivery circuit 110 may form a connection assembly 118 with the fuel inlet 198 of the second fuel cell module 108B, may form a connection assembly 118 with the fuel inlet 198 of the third fuel cell module 108C, and may form a connection assembly 118 with the fuel inlet 198 of the fourth fuel cell module 108D. Each of these connection assemblies 118 may be positioned proximate to the respective fuel cell module 108 and in series with the respective fuel cell module 108, with only the respective fuel cell module 108 being downstream of the respective connection assembly 118.

Similarly, the air delivery circuit 112 may form a plurality of connection assemblies 118 with the air inlets 200 of the plurality of fuel cell modules 108 (see FIG. 3). In particular, the air lines 116 of the air delivery circuit 112 may form a connection assembly 118 with the air inlet 200 of the first fuel cell module 108A, a connection assembly 118 with the air inlet 200 of the second fuel cell module 108B, a connection assembly 118 with the air inlet 200 of the third fuel cell module 108C, and a connection assembly 118 with the air inlet 200 of the fourth fuel cell module 108D. Each of these exemplary connection assemblies 118 may be configured in a similar manner as the connection assembly 118 described above with reference to Circle A.

Moreover, as also briefly noted above, the exemplary fuel cell assembly 100 includes the power electronics device 106. The power electronics device 106 may be a device including power electronics for conversion, control, conditioning, or a combination thereof of electric power by static means, such as a DC/DC converter, a DC/AC converter, or the like.

The fuel cell assembly 100 further includes an electric bus 126 electrically coupled, for the embodiment depicted to an aircraft power bus 128 through the power electronics device 106. The electric bus 126 extends from the power electronics device 106 to each of the plurality of fuel cell modules 108. The electric bus 126 may be electrically coupled to each of the plurality of fuel cell modules 108 through removable electrical connection, such as a quick release electrical connection (e.g., a plug and socket connection). In such a manner, the electric bus 126 may receive electric power from each of the plurality of fuel cell modules 108 during operation of the fuel cell assembly 100.

Further, as also depicted schematically in FIG. 2, the fuel cell assembly 100 includes a fuel cell exhaust structure 130. Each of the plurality of fuel cell modules 108 is fluidly coupled to the fuel cell exhaust structure 130 through a respective exhaust line 132. The exhaust line 132 may utilize a removable fluid connection (e.g., a threaded connection, a quick release connection, etc.).

However, it will be appreciated that in other exemplary embodiments, the fuel cell assembly 100 may be configured to directly exhaust output products from the plurality of fuel cell modules 108 to the fuel cell exhaust structure 130.

The fuel cell exhaust structure 130 may include an exhaust conditioner to condition the output products flowing within or through the fuel cell exhaust structure 130 to make the output products suitable for exhausting to, e.g., atmosphere. Notably, in at least certain exemplary embodiments, the output products within or through the fuel cell exhaust structure 130 may be utilized for generating additional work (e.g., through combustion within a separate engine, not shown).

In such a manner, it will be appreciated that each of the plurality of fuel cell modules 108 may be independently removable from the fuel cell assembly 100 relative to at least one of the other fuel cell modules 108 of the plurality of fuel cell modules 108 of the fuel cell assembly 100.

Figure 5:
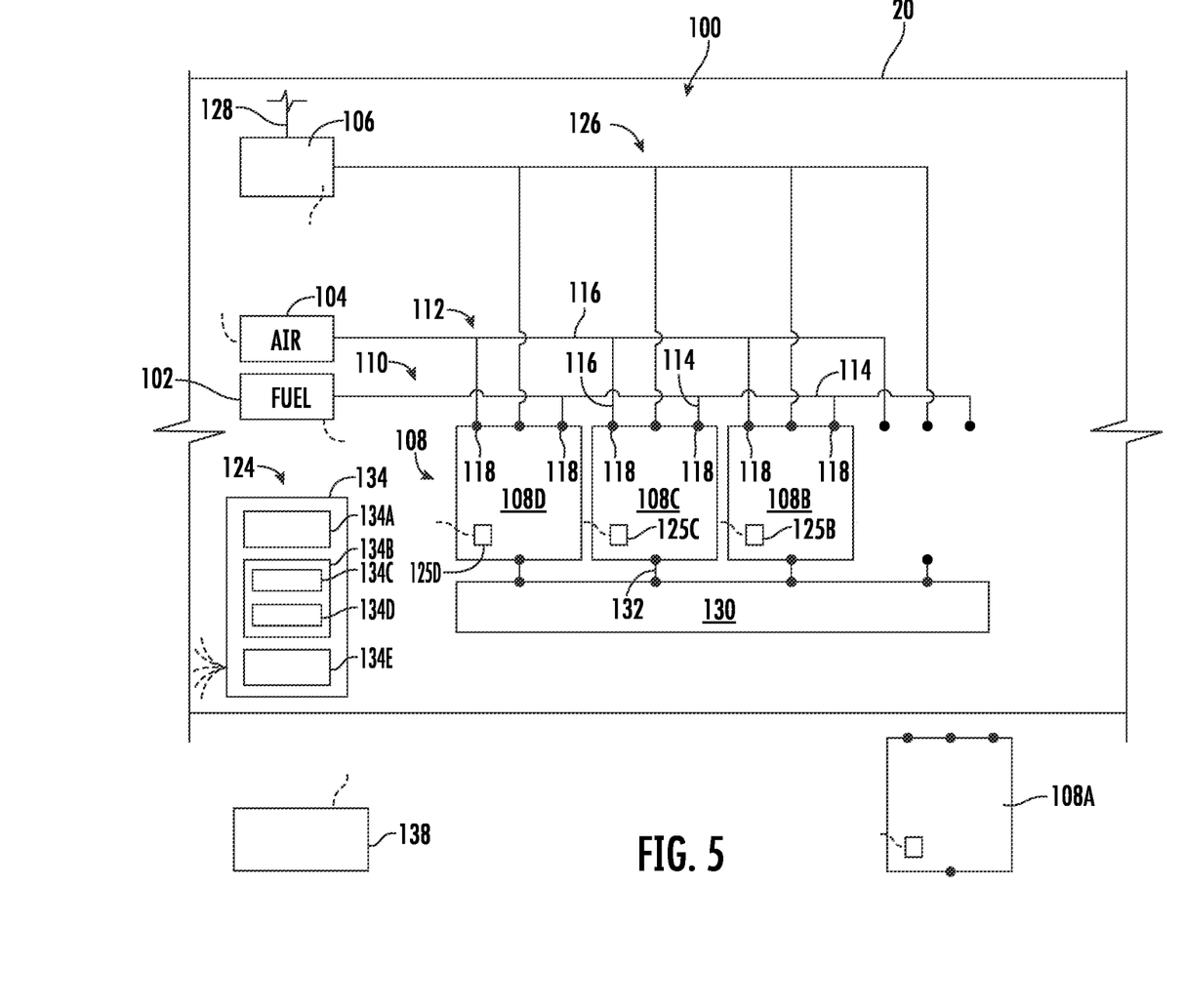
FIG. 5 is a schematic view of the exemplary fuel cell assembly of FIG. 2 in a second configuration.

For example, referring now also to FIG. 5, the exemplary fuel cell assembly 100 of FIG. 2 is depicted with the first fuel cell module 108A of the plurality fuel cell modules 108 removed from within the fuselage 20 of the aircraft 10. Notably, the connection assembly 118 formed by the fuel lines 114 of the fuel delivery circuit 110 and the fuel inlet 198 of the first fuel cell module 108A, as well as the connection assembly 118 formed by the air line 116 of the air delivery circuit 112 and the air inlet 200 of the first fuel cell module 108A (see FIG. 2), may facilitate such a removal without removing the remaining fuel cell modules 108. In particular, the shut-off valve 120 of each of these connection assemblies 118 may be moved to a closed position to prevent fuel and air from traveling through the fuel line 114 and air line 116, respectively (see FIG. 2). Subsequently, the fluid connections 122 may be disconnected such that the fuel line 114 and fuel inlet 198 are no longer in fluid communication and the air line 116 in the air inlet 200 are similarly no longer in fluid communication. The exhaust line 132 of the first fuel cell module 108A may similarly be disconnected from the fuel cell exhaust structure 130, and the electric bus 126 may be disconnected from the first fuel cell module 108A.

In such a manner, the first fuel cell module 108A is independently removable from the fuel cell assembly 100 relative to at other fuel cell modules 108. Further, the second fuel cell module 108B, the third fuel cell module 108C, and the fourth fuel cell module 108D are each also independently removable from the fuel cell assembly 100 relative to at other fuel cell modules 108. In such a manner, as will be described in more detail below, the fuel cell assembly 100 may be reconfigured between flights to be sized specifically for an anticipated electrical load for a subsequent flight operation.

In particular, removal of the first fuel cell module 108A, and optionally other fuel cell modules 108 of the fuel cell assembly 100, may allow for the fuel cell assembly 100 to be reconfigured relatively quickly and easily to change a power capacity of the fuel cell assembly 100 for an anticipated power load for particular operation, such as a subsequent flight operation. As will be appreciated, reconfiguring the fuel cell assembly 100 for a lower power capacity (i.e., removing one or more fuel cell modules 108) may significantly reduce a weight of the fuel cell assembly 100 for a particular operation in which it is anticipated a lower power output will be needed from the fuel cell assembly 100. Alternatively, if the fuel cell assembly 100 is not configured with all the potential fuel cell modules 108 in position (see FIG. 5), the fuel cell assembly 100 may be reconfigured to define an increased power capacity (i.e., adding one or more fuel cell modules 108).

As used herein, the term "power capacity" refers to a maximum power output that may be achievable by the fuel cell assembly 100 without prematurely wearing the fuel cell assembly 100.

Briefly, as noted above, it will further be appreciated that the exemplary fuel cell assembly 100 depicted additionally includes the controller 124. The exemplary controller 124 depicted in FIG. 2 may be configured to receive data sensed from the one or more sensors. In particular, for the embodiment depicted, the fuel cell assembly 100 includes a first sensor 125A configured to sense data indicative of the first fuel cell module 108A, a second sensor 125B configured to sense data indicative of the second fuel cell module 108B, a third sensor 125C configured to sense data indicative of the third fuel cell module 108C, and a fourth sensor 125D configured to sense data indicative of the fourth fuel cell module 108D. The controller 124 is configured to receive data from each of these sensors 125A, 125B, 125C, 125D.

The controller 124 may further make control decisions for the fuel cell assembly 100 based on the received data. For example, the controller 124 is further in operable communication with the fuel source 102 and the air source 104, and may make control decisions for the fuel and/or air sources 102, 104 in response to data sensed by the sensors 125A, 125B, 125C, 125D.

In one or more exemplary embodiments, the controller 124 depicted in FIG. 2 may be a stand-alone controller 124 for the fuel cell assembly 100, or alternatively, may be integrated into, e.g., the aircraft controller 50 for the aircraft 10 including the gas turbine engine with which the fuel cell assembly 100 is integrated.

Referring particularly to the operation of the controller 124, in at least certain embodiments, the controller 124 can include one or more computing device(s) 134. The computing device(s) 134 can include one or more processor(s) 134A and one or more memory device(s) 134B. The one or more processor(s) 134A can include any suitable processing device, such as a microprocessor, microcontroller, integrated circuit, logic device, and/or other suitable processing device. The one or more memory device(s) 134B can include one or more computer-readable media, including, but not limited to, non-transitory computer-readable media, RAM, ROM, hard drives, flash drives, and/or other memory devices.

Figure 7:
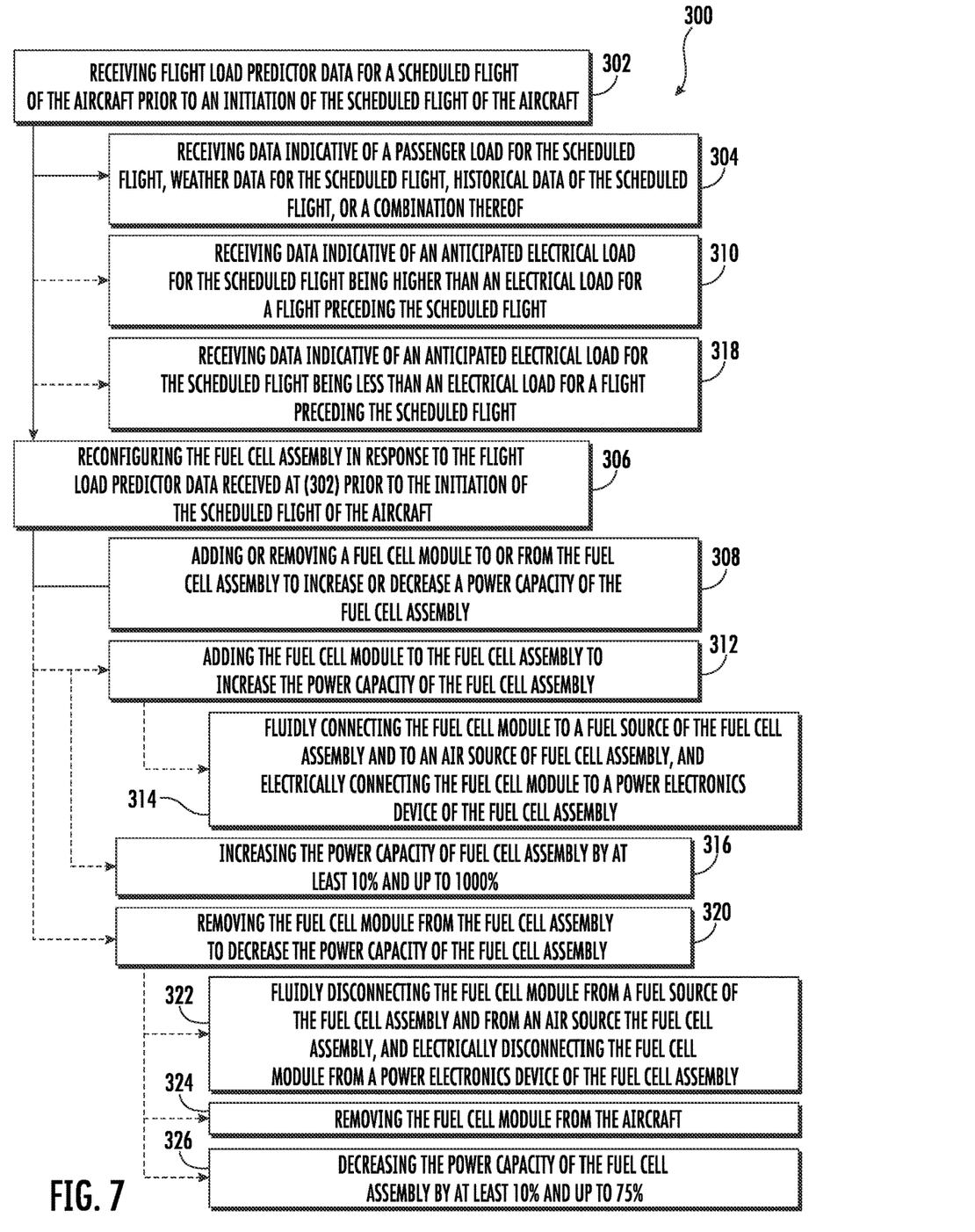
FIG. 7 is a flow diagram of a method for operating a fuel cell assembly in accordance with an exemplary aspect of the present disclosure.

The one or more memory device(s) 134B can store information accessible by the one or more processor(s) 134A, including computer-readable instructions 134C that can be executed by the one or more processor(s) 134A. The instructions 134C can be any set of instructions that when executed by the one or more processor(s) 134A, cause the one or more processor(s) 134A to perform operations. In some embodiments, the instructions 134C can be executed by the one or more processor(s) 134A to cause the one or more processor(s) 134A to perform operations, such as any of the operations and functions for which the controller 124 and/or the computing device(s) 134 are configured, the operations for operating a fuel cell assembly 100 (e.g., method 300), as described herein, and/or any other operations or functions of the one or more computing device(s) 134. The instructions 134C can be software written in any suitable programming language or can be implemented in hardware. Additionally, and/or alternatively, the instructions 134C can be executed in logically and/or virtually separate threads on the one or more processor(s) 134A. The one or more memory device(s) 134B can further store data 134D that can be accessed by the one or more processor(s) 134A. For example, the data 134D can include data indicative of power flows, data indicative of engine/aircraft operating conditions, and/or any other data and/or information described herein.

The computing device(s) 134 can also include a network interface 134E used to communicate, for example, with the other components of the fuel cell assembly 100, the aircraft incorporating the fuel cell assembly 100, an outside data source 138, etc. For example, in the embodiment depicted, as noted above, the fuel cell assembly 100 includes one or more sensors for sensing data indicative of one or more parameters of the fuel cell assembly 100 (sensors 125A, 125B, 125C, 125D). The controller 124 of the fuel cell assembly 100 is operably coupled to the one or more sensors through, e.g., the network interface 134E, such that the controller 124 may receive data indicative of various operating parameters sensed by the one or more sensors during operation. The controller 124 may also be operably coupled to the outside data source 138 through the network interface 134E. The outside data source 138 may provide flight load predictor data to the controller 124, such as data indicative of a passenger load for the scheduled flight, weather data for the scheduled flight, historical data of the scheduled flight, or a combination thereof.

Further, for the embodiment shown the controller 124 is operably coupled to, e.g., the fuel source 102 and the air source 104. In such a manner, the controller 124 may be configured to control a fuel flow and/or an air flow in response to, e.g., the data sensed by the one or more sensors.

The network interface 134E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated, however, that in other exemplary embodiments, the exemplary fuel cell assembly 100 may alternatively be configured in any other suitable manner. For example, it will be appreciated that although in the exemplary embodiment of FIGS. 2 and 5, the plurality of fuel cell modules 108 are each independently removable from the fuel cell assembly 100, in other exemplary embodiments, one or more of the plurality fuel cell modules 108 may be permanently fixed within the fuel cell assembly 100. Further, although the exemplary embodiment of FIGS. 2 and 5 includes a total of four fuel cell modules 108, in other exemplary embodiments, the fuel cell assembly 100 may include any suitable number of fuel cell modules 108. For example, and others exemplary embodiments, the fuel cell assembly 100 may include at least two fuel cell modules 108, such as at least three fuel cell modules 108, such as at least five fuel cell modules 108, such as up to 100 fuel cell modules 108.

Moreover, in at least certain exemplary embodiments, each of the plurality of fuel cell modules 108 may be the same size and may be configured to generate the same power output as the remaining plurality of fuel cell modules 108.

Figure 6:
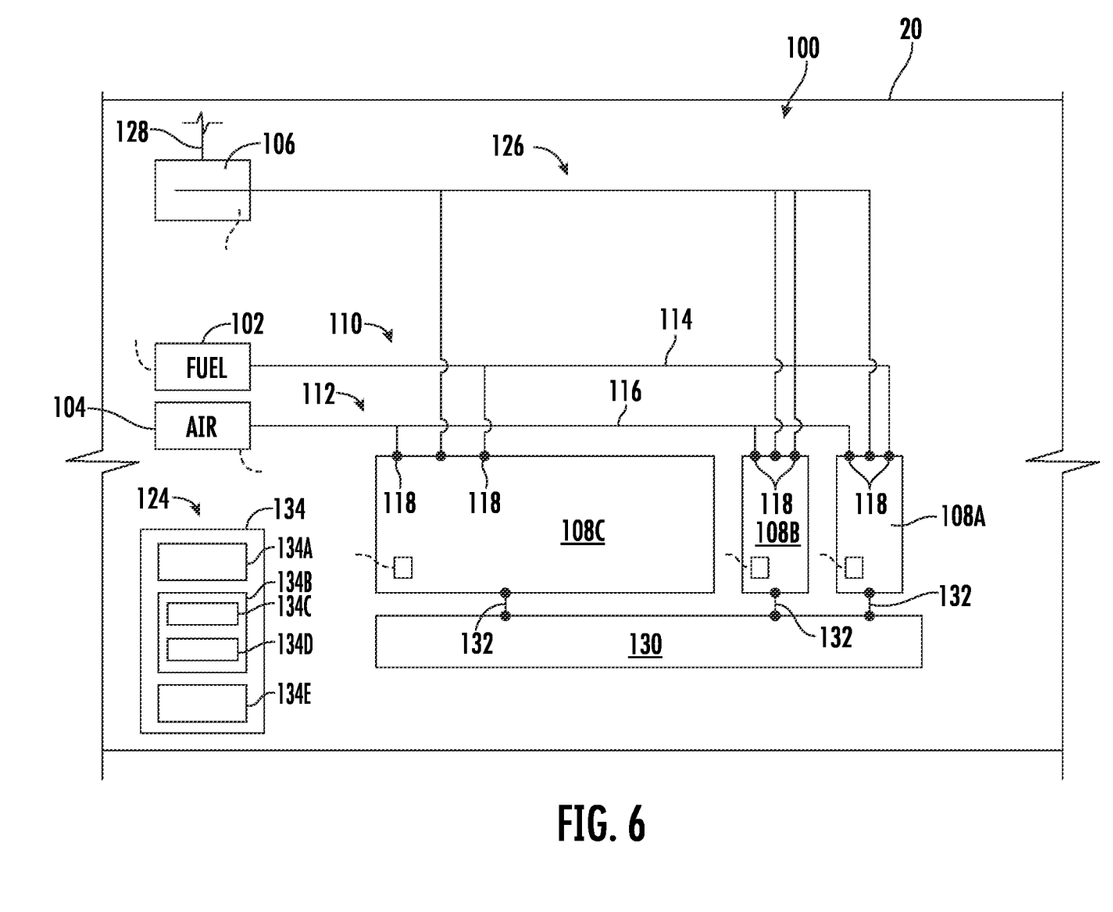
FIG. 6 is a schematic view of a fuel cell assembly in accordance with another exemplary aspect of the present disclosure.

However, in other embodiments, the plurality of fuel cell modules 108 may vary in size, and vary in an amount of power output they are configured to generate (e.g., the number of fuel cells in the fuel cell stack of the fuel cell module 108). For example, referring briefly to FIG. 6, providing a schematic view of a fuel cell assembly 100 in accordance with another exemplary aspect of the present disclosure, the fuel cell assembly 100 includes a first fuel cell module 108A, a second fuel cell module 108B, and a third fuel cell module 108. For the embodiment shown, the third fuel cell module 108C is larger than the first fuel cell module 108A and the second fuel cell module 108B. The third fuel cell module 108C may be configured to generate more power output than the first fuel cell module 108A and the second fuel cell module 108B individually (e.g., at least 10% more power output, such as at least 25% more power output, such as at least 50% more power output, such as up to 1000% more power output). In such a manner, a power capacity of the fuel cell assembly 100 may be varied with greater precision the removal of a single fuel cell module 108.

Moreover, referring now to FIG. 7, a method 300 of operating a fuel cell assembly for an aircraft is provided. The method 300 may be utilized to operate one or more of the exemplary fuel cell assemblies 100 described herein.

The exemplary aspect of the method 300 depicted in FIG. 7 generally includes at (302) receiving flight load predictor data for a scheduled flight of the aircraft prior to an initiation of the scheduled flight of the aircraft. As used herein, the term "initiation" with reference to a scheduled flight of the aircraft refers to the aircraft starting a takeoff phase of a flight envelope of the scheduled flight.

More specifically, for the exemplary aspect depicted, receiving the flight load predictor data for the scheduled flight at (302) includes at (304) receiving data indicative of a passenger load for the scheduled flight, weather data for the scheduled flight, historical data of the scheduled flight, or a combination thereof. More specifically, for the exemplary aspect depicted, receiving the flight load predictor data for the scheduled flight at (302) includes receiving data indicative of the passenger load for a scheduled flight (e.g., a number of passengers on the scheduled flight, a percent occupancy for the scheduled flight, or the like).

As will be appreciated, the passenger load for the scheduled flight may be a significant indicator of an amount of electrical power that will be consumed by the aircraft during the scheduled flight. In such a manner, it will be appreciated that receiving flight load predictor data for a scheduled flight at (302) may include receiving data indicative of an anticipated electrical load for the scheduled flight.

Referring still to FIG. 7, the exemplary method 300 further includes at (306) reconfiguring the fuel cell assembly in response to the flight load predictor data received at (302) prior to the initiation of the scheduled flight of the aircraft. In particular, for the exemplary aspect of the method 300 depicted, reconfiguring the fuel cell assembly at (306) includes at (308) adding or removing a fuel cell module to or from the fuel cell assembly to increase or decrease a power capacity of the fuel cell assembly. As will also be appreciated, adding or removing the fuel cell module to or from the fuel cell assembly may correspondingly increase or decrease a weight of the fuel cell assembly.

For example, in one exemplary aspect of the method 300, as depicted in FIG. 7, receiving flight load predictor data at (302) includes at (310) receiving data indicative of an anticipated electrical load for the scheduled flight being higher than an electrical load for a flight preceding the scheduled flight (and higher than an electrical load that may be met by the fuel cell assembly in the current configuration). With such an exemplary aspect, reconfiguring the fuel cell assembly at (306) includes at (312) adding the fuel cell module to the fuel cell assembly to increase the power capacity of the fuel cell assembly.

Further, for the exemplary aspect depicted, adding the fuel cell module to the fuel cell assembly at (312) includes at (314) fluidly connecting the fuel cell module to a fuel source of the fuel cell assembly and to an air source of fuel cell assembly, and electrically connecting the fuel cell module to a power electronics device of the fuel cell assembly.

Notably, in at least certain exemplary aspects, adding the fuel cell module to the fuel cell assembly may include adding a plurality fuel cell modules to the fuel cell assembly.

With such exemplary aspect, it will be appreciated that reconfiguring the fuel cell assembly at (306) includes at (316) increasing the power capacity of fuel cell assembly by at least 10% and up to 1000%. For example, in certain exemplary aspect, reconfiguring the fuel cell assembly at (306) may include increasing the power capacity the fuel cell by at least 25%, such as by at least 50%, such as by at least 100%, such as up to 500%, such as up to 350%, such as up to 200%.

Moreover, for the exemplary aspect of the method 300 of FIG. 7, receiving the flight load predictor data at (302) may additionally or alternatively include at (318) receiving data indicative of an anticipated electrical load for the scheduled flight being less than an electrical load for a flight preceding the scheduled flight (and lower than an electrical load that may be met by the fuel cell assembly in the current configuration). With such an exemplary aspect, reconfiguring the fuel cell assembly at (306) further includes at (320) removing the fuel cell module from the fuel cell assembly to decrease the power capacity of the fuel cell assembly.

In the exemplary aspect depicted, removing the fuel cell module from the fuel cell assembly at (320) includes at (322) fluidly disconnecting the fuel cell module from a fuel source of the fuel cell assembly and from an air source the fuel cell assembly, and electrically disconnecting the fuel cell module from a power electronics device of the fuel cell assembly.

Notably, for exemplary aspect depicted, the fuel cell assembly is positioned within the aircraft and removing the fuel cell module from the fuel cell assembly at (320) includes at (324) removing the fuel cell module from the aircraft.

In such a manner, will be appreciated that reconfiguring the fuel cell assembly at (302) may further include at (326) decreasing the power capacity of the fuel cell assembly by at least 10% and up to 75%. For example, reconfiguring the fuel cell assembly may include decreasing power capacity by at least 15%, such as by at least 25%, such as by at least 50%.

Operating a fuel cell assembly in accordance with the exemplary method 300 may allow for a fuel cell assembly that is configured specifically for the amount of power needed by the aircraft for a particular flight operation. In such a manner, a weight of the fuel cell assembly may be reduced for lower power consumption flights (e.g., with a lower passenger count), improving a fuel efficiency of the aircraft.

Further aspects are provided by the subject matter of the following clauses:

A method of operating a fuel cell assembly for an aircraft, the method comprising: receiving flight load predictor data for a scheduled flight of the aircraft prior to initiation of the scheduled flight of the aircraft; and reconfiguring the fuel cell assembly in response to the received flight load predictor data prior to the initiation of the scheduled flight of the aircraft, wherein reconfiguring the fuel cell assembly comprises adding or removing a fuel cell module to or from the fuel cell assembly to increase or decrease a power capacity of the fuel cell assembly.

The method of the preceding clause, wherein receiving flight load predictor data comprises receiving data indicative of a passenger load for the scheduled flight, weather data for the scheduled flight, historical data of the scheduled flight, or a combination thereof.

The method of any of the preceding clauses, wherein receiving flight load predictor data comprises receiving data indicative of a passenger load for the scheduled flight.

The method of any of the preceding clauses, wherein receiving flight load predictor data comprises receiving data indicative of an anticipated electrical load for the scheduled flight being higher than an electrical load for a flight preceding the scheduled flight, and wherein reconfiguring the fuel cell assembly comprises adding the fuel cell module to the fuel cell assembly to increase the power capacity of the fuel cell assembly.

The method of any of the preceding clauses, wherein adding the fuel cell module to the fuel cell assembly comprises fluidly connecting the fuel cell module to a fuel source of the fuel cell assembly and to an air source of the fuel cell assembly, and electrically connecting the fuel cell module to a power electronics device of the fuel cell assembly.

The method of any of the preceding clauses, wherein reconfiguring the fuel cell assembly comprises increasing the power capacity of the fuel cell assembly by at least 10% and up to 500%.

The method of any of the preceding clauses, wherein receiving flight load predictor data comprises receiving data indicative of an anticipated electrical load for the scheduled flight being less than an electrical load for a flight preceding the scheduled flight, and wherein reconfiguring the fuel cell assembly comprises removing the fuel cell module from the fuel cell assembly to decrease the power capacity of the fuel cell assembly.

The method of any of the preceding clauses, wherein removing the fuel cell module from the fuel cell assembly comprises fluidly disconnecting the fuel cell module from a fuel source of the fuel cell assembly and from an air source of the fuel cell assembly, and electrically disconnecting the fuel cell module from a power electronics device of the fuel cell assembly.

The method of any of the preceding clauses, wherein the fuel cell assembly is positioned within the aircraft, and wherein removing the fuel cell module from the fuel cell assembly comprises removing the fuel cell module from the aircraft.

The method of any of the preceding clauses, wherein reconfiguring the fuel cell assembly comprises decreasing the power capacity of the fuel cell assembly by at least 10% and up to 75%.

A power system for an aircraft, the aircraft comprising a fuselage, a wing, and a propulsor, the power system comprising: a fuel cell assembly configured to be positioned within the fuselage, the wing, the propulsor, or a combination thereof when installed in the aircraft, the fuel cell assembly comprising: a plurality of fuel cell modules including a first fuel cell module, the first fuel cell module independently removable from the fuel cell assembly relative to one or more other fuel cell modules of the plurality of fuel cell modules.

The power system of any of the preceding clauses, the fuel cell assembly further comprises: a fuel source; an air source; and a power electronics device, wherein each of the plurality of fuel cell modules is fluidly coupled to the fuel source and the air source, and electrically coupled to the power electronics device.

The power system of any of the preceding clauses, wherein the first fuel cell module is fluidly coupled to the fuel source and the air source in parallel with the one or more other fuel cell modules of the plurality of fuel cell modules.

The power system of any of the preceding clauses, wherein the plurality of fuel cell modules comprises a first fuel cell module, wherein the first fuel cell module comprises a fuel inlet, wherein first fuel cell module is fluidly coupled to the fuel source through a connection assembly formed in part by the fuel inlet, wherein the connection assembly comprises a shut-off valve and a fluid connection.

The power system of any of the preceding clauses, wherein the plurality of fuel cell modules comprises a first fuel cell module, wherein the first fuel cell module comprises an air inlet, wherein first fuel cell module is fluidly coupled to the air source through a connection assembly formed in part by the air inlet, wherein the connection assembly comprises a shut-off valve and a fluid connection.

The power system of any of the preceding clauses, wherein the fuel source is a fuel source of the aircraft.

The power system of any of the preceding clauses, wherein the plurality of fuel cell modules comprises at least three fuel cell modules.

The power system of any of the preceding clauses, wherein each fuel cell module of the plurality of fuel cell modules is independently removable from the fuel cell assembly relative to the other fuel cell modules of the plurality of fuel cell modules.

The power system of any of the preceding clauses, wherein the fuel cell assembly defines a reduced power capacity when the first fuel cell module is removed from the fuel cell assembly.

The power system of any of the preceding clauses, wherein the fuel cell assembly is configured to be positioned within the fuselage of the aircraft.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of operating a fuel cell assembly for an aircraft, the method comprising:
    receiving flight load predictor data for a scheduled flight of the aircraft prior to initiation of the scheduled flight of the aircraft; and
    reconfiguring the fuel cell assembly in response to the received flight load predictor data prior to the initiation of the scheduled flight of the aircraft, wherein reconfiguring the fuel cell assembly comprises adding or removing a fuel cell module to or from the fuel cell assembly to increase or decrease a power capacity of the fuel cell assembly.

2. The method of claim 1, wherein receiving flight load predictor data comprises receiving data indicative of a passenger load for the scheduled flight, weather data for the scheduled flight, historical data of the scheduled flight, or a combination thereof.

3. The method of claim 1, wherein receiving flight load predictor data comprises receiving data indicative of a passenger load for the scheduled flight.

4. The method of claim 1, wherein receiving flight load predictor data comprises receiving data indicative of an anticipated electrical load for the scheduled flight being higher than an electrical load for a flight preceding the scheduled flight, and wherein reconfiguring the fuel cell assembly comprises adding the fuel cell module to the fuel cell assembly to increase the power capacity of the fuel cell assembly.

5. The method of claim 4, wherein adding the fuel cell module to the fuel cell assembly comprises fluidly connecting the fuel cell module to a fuel source of the fuel cell assembly and to an air source of the fuel cell assembly, and electrically connecting the fuel cell module to a power electronics device of the fuel cell assembly.

6. The method of claim 4, wherein reconfiguring the fuel cell assembly comprises increasing the power capacity of the fuel cell assembly by at least 10% and up to 500%.

7. The method of claim 6, wherein removing the fuel cell module from the fuel cell assembly comprises fluidly disconnecting the fuel cell module from a fuel source of the fuel cell assembly and from an air source of the fuel cell assembly, and electrically disconnecting the fuel cell module from a power electronics device of the fuel cell assembly.

8. The method of claim 6, wherein the fuel cell assembly is positioned within the aircraft, and wherein removing the fuel cell module from the fuel cell assembly comprises removing the fuel cell module from the aircraft.

9. The method of claim 6, wherein reconfiguring the fuel cell assembly comprises decreasing the power capacity of the fuel cell assembly by at least 10% and up to 75%.

10. The method of claim 1, wherein receiving flight load predictor data comprises receiving data indicative of an anticipated electrical load for the scheduled flight being less than an electrical load for a flight preceding the scheduled flight, and wherein reconfiguring the fuel cell assembly comprises removing the fuel cell module from the fuel cell assembly to decrease the power capacity of the fuel cell assembly.

11. A power system for an aircraft, the aircraft comprising a fuselage, a wing, and a propulsor, the power system comprising:
    a fuel cell assembly configured to be positioned within the fuselage, the wing, the propulsor, or a combination thereof when installed in the aircraft, the fuel cell assembly comprising:
        a plurality of fuel cell modules including a first fuel cell module, the first fuel cell module independently removable from the fuel cell assembly relative to one or more other fuel cell modules of the plurality of fuel cell modules; and
    a controller configured to receive flight load predictor data for a scheduled flight of the aircraft prior to initiation of the scheduled flight of the aircraft, the plurality of fuel cell modules being reconfigurable in response to the received flight load predictor data to increase or decrease a power capacity of the fuel cell assembly.

12. The power system of claim 11, the fuel cell assembly further comprises:
    a fuel source;
    an air source; and
    a power electronics device, wherein each of the plurality of fuel cell modules is fluidly coupled to the fuel source and the air source, and electrically coupled to the power electronics device.

13. The power system of claim 12, wherein the first fuel cell module is fluidly coupled to the fuel source and the air source in parallel with the one or more other fuel cell modules of the plurality of fuel cell modules.

14. The power system of claim 12, wherein the plurality of fuel cell modules comprises a first fuel cell module, wherein the first fuel cell module comprises a fuel inlet, wherein first fuel cell module is fluidly coupled to the fuel source through a connection assembly formed in part by the fuel inlet, wherein the connection assembly comprises a shut-off valve and a fluid connection.

15. The power system of claim 12, wherein the plurality of fuel cell modules comprises a first fuel cell module, wherein the first fuel cell module comprises an air inlet, wherein first fuel cell module is fluidly coupled to the air source through a connection assembly formed in part by the air inlet, wherein the connection assembly comprises a shut-off valve and a fluid connection.

16. The power system of claim 12, wherein the fuel source is a fuel source of the aircraft.

17. The power system of claim 11, wherein the plurality of fuel cell modules comprises at least three fuel cell modules.

18. The power system of claim 11, wherein each fuel cell module of the plurality of fuel cell modules is independently removable from the fuel cell assembly relative to the other fuel cell modules of the plurality of fuel cell modules.

19. The power system of claim 11, wherein the fuel cell assembly defines a reduced power capacity when the first fuel cell module is removed from the fuel cell assembly.

20. The power system of claim 11, wherein the fuel cell assembly is configured to be positioned within the fuselage of the aircraft.

\* \* \* \* \*